(12) United States Patent
Hilk

(10) Patent No.: US 6,435,523 B1
(45) Date of Patent: Aug. 20, 2002

(54) SURROGATE TOP TUBE

(75) Inventor: Lyle R. Hilk, Eureka, CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/616,466

(22) Filed: Jul. 14, 2000

(51) Int. Cl.[7] ............................................. B62H 3/02
(52) U.S. Cl. ...................... 280/7.11; 224/426; 280/202; 280/278; 280/288.4
(58) Field of Search ............................. 280/7.11, 7.15, 280/278, 287, 288.4, 279, 202, 30, 281.1, 274, 304.3, 304.5; 224/421, 426

(56) References Cited

U.S. PATENT DOCUMENTS

| | | |
|---|---|---|
| 443,482 A | 12/1890 | Hunt |
| 529,861 A | 11/1894 | Hersh |
| 582,678 A * | 5/1897 | Pates |
| 620,459 A * | 2/1899 | Koehler |
| 704,317 A | 7/1902 | Gillis |
| 2,227,252 A | 12/1940 | Giambra |
| 2,354,125 A | 7/1944 | Johnston |
| 2,773,695 A | 12/1956 | Holloway |
| 2,804,310 A | 8/1957 | Hokkanen |
| 3,113,785 A | 12/1963 | Bohnenkamp |
| 3,724,865 A | 4/1973 | Cristie |
| 4,582,335 A | 4/1986 | Paioli et al. |
| 4,842,292 A | 6/1989 | Wang |
| 4,970,630 A | 11/1990 | Mudrovich |
| 5,149,112 A | 9/1992 | Nauman et al. |
| 5,197,795 A | 3/1993 | Mudrovich |
| 5,315,895 A | 5/1994 | Kattus et al. |
| 5,456,482 A | 10/1995 | Rau |
| 5,467,906 A | 11/1995 | Forman |
| D371,332 S | 7/1996 | Chapple et al. |
| 5,558,349 A | 9/1996 | Rubin |

FOREIGN PATENT DOCUMENTS

| | | | |
|---|---|---|---|
| DE | 811 323 | | 8/1951 |
| GB | 2239 | * | 3/1897 |
| GB | 23846 | * | 11/1899 |

* cited by examiner

*Primary Examiner*—Anne Marie Boehler
(74) *Attorney, Agent, or Firm*—Kolisch Hartwell Dickinson McCormack & Heuser

(57) ABSTRACT

A surrogate top tube for use in attaching bicycle without top tubes to vehicle-mounted carriers. The top tube includes yokes at each end for selective attachment to the seat tube and a vertical portion of the handlebars. The top tube may includes structure to prevent the yokes from rotating relative to each other about an axis extending therebetween. The yokes may also include a safety retainer to prevent the yoke from accidentally opening.

2 Claims, 3 Drawing Sheets

SURROGATE TOP TUBE

FIELD OF THE INVENTION

The present invention relates to bicycle carriers and more particularly to a surrogate top tube used to facilitate mounting of bicycles to a vehicle-mounted carrier.

BACKGROUND OF THE INVENTION

Bicycles are often transported between locations on mounts that attach to vehicles. In many cases, these mounts incorporate an arm or cradle that the top tube of a bicycle rests on or in to support the bicycle. However, women's bicycles and many newer, non-traditional frames do not have a top tube. As a result, these types of bicycles cannot be directly mounted on many carriers.

In order to overcome the above difficulty, several different surrogate top tube designs have been developed. These devices have a yoke structure at each end of a telescoping tube. The yokes typically attach to the seat tube and the vertical tube of the handlebars. Unfortunately, existing designs suffer from a number of drawbacks. Some systems are relatively difficult to secure and include separate pieces that may easily be misplaced. Other systems, while easy to attach, do not provide a robust connection to the bicycle. Some designs are configured in a way that allow a user to incorrectly install them on a bicycle, such as between a seat tube and the horizontal members on the handlebars, rather than to the vertical member. As a result of mis-installation, this latter device may fail during use, allowing the bicycle to fall from the rack.

DETAILED DESCRIPTION

Figure 1:
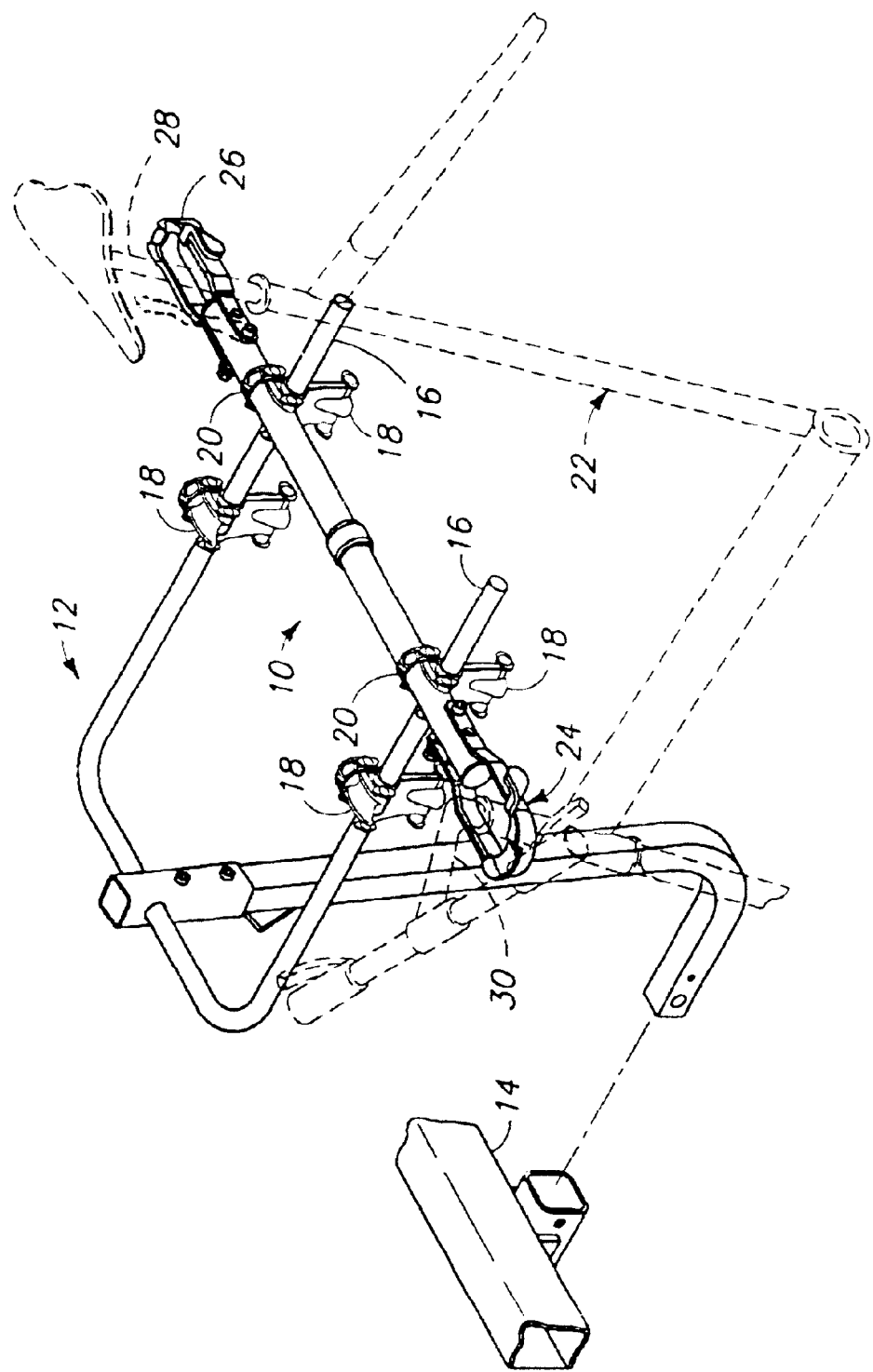
FIG. 1 is an isometric view of a surrogate top tube according to the present invention attached to a bicycle carrier.

A surrogate top tube according to the present invention is shown generally at 10 in FIG. 1. Tube 10 is shown mounted in a carrier 12 adapted to mount to a hitch 14. The carrier includes arms 16 that support cradles 18. The top tube is secured in cradles 18 by straps 20, just as the top tube of a bicycle would normally be gripped. A bicycle 22 is shown in dashed lines held by tube 10. Tube 10 includes bicycle-gripping mechanisms 24, 26 disposed at each end. The gripping mechanisms are described in more detail below and are adapted to selectively receive and secure a vertical tube member of the bicycle, such as seat tube 28 and handlebar tube 30.

Figure 2:
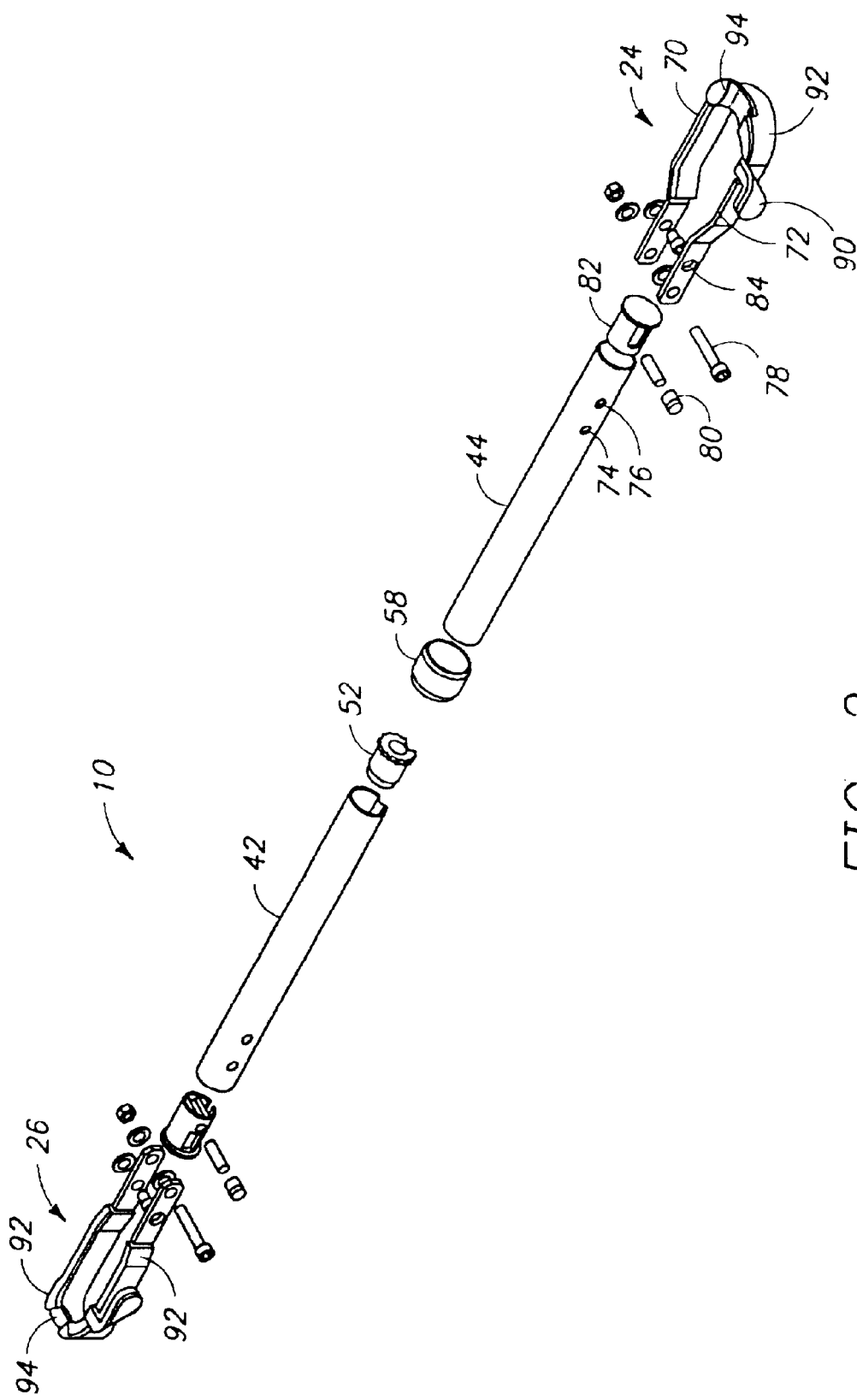
FIG. 2 is an exploded isometric view of the surrogate top tube of FIG. 1.
Figure 3:
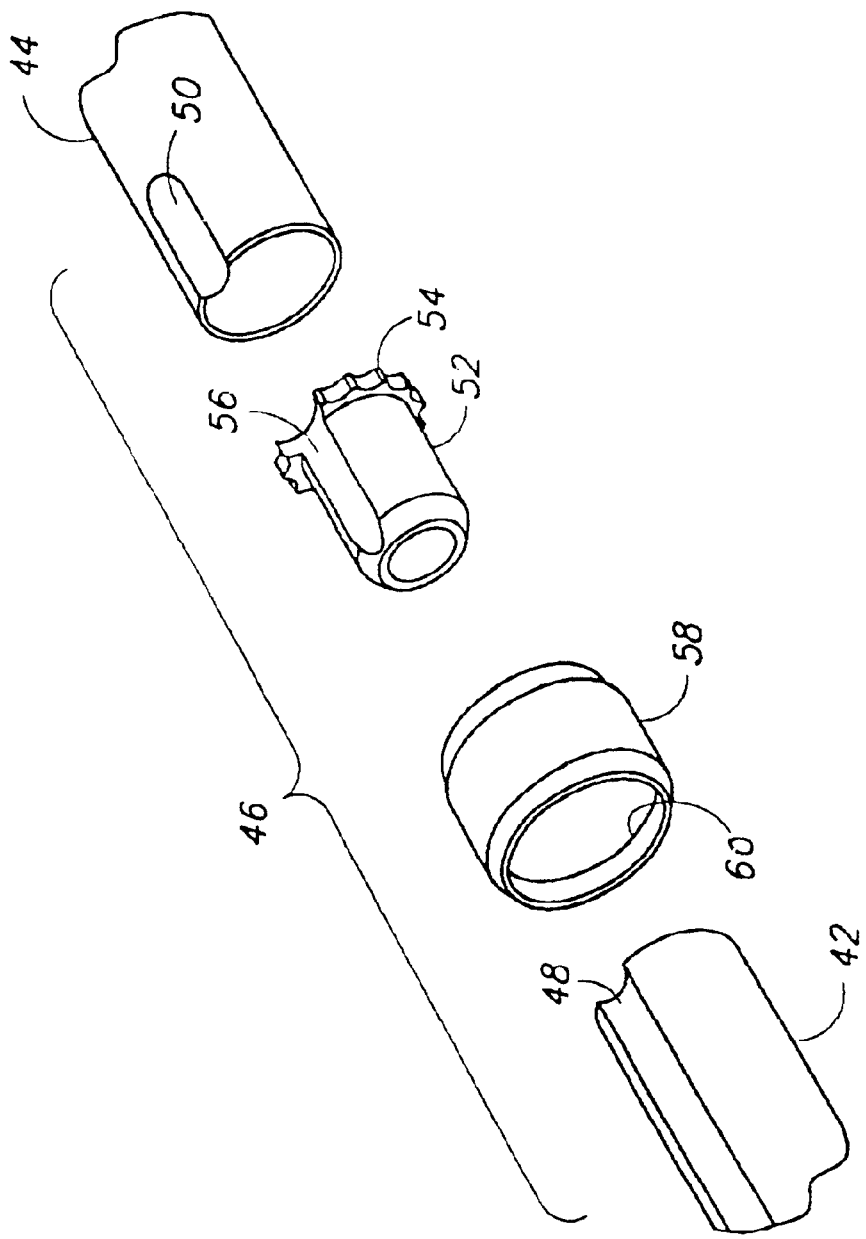
FIG. 3 is an exploded isometric view of an anti-rotation structure.

As shown in FIG. 2, tube 10 includes an elongate support structure 40 formed by sections 42, 44 of metal tubing. Section 42 is sized to fit telescopically into section 44 to allow the length of the support structure to be adjusted to accommodate different size bicycles. An anti-rotation structure 46 that prevents the sections from rotating relative to each other is shown in FIG. 3. The anti-rotation structure basically consists of a groove 48 formed in the otherwise circular wall of section 42 that interfits with a corresponding depression 50 formed at the end of section 44.

A plastic plug 52 with a serrated flange 54 and a recess 56 is press fit into the end of section 42. The outer surfaces of the serrated flange are slightly larger than the outside diameter of section 42 and form a contact portion to ride against the internal surface of section 44. The recess accommodates the groove formed along the length of section 42. Once the sections are assembled together, a plastic collar 58 is slipped over section 42 and press fit onto the end of section 44. Collar 58 includes a shallow lip 60 that projects slightly inside the inside diameter of section 44 and engages the serrations on plug 52 to prevent the sections from separating after assembly.

By insuring that the gripping mechanisms or yokes remain in the same plane, the anti-rotation structure prevents the user from installing one end of the tube on a vertically oriented seat tube and the other end on a horizontally oriented portion of the handlebar. This latter configuration creates a substantial lateral load on the yokes for which they were not designed and may lead to failure.

The yokes disposed at each end of the elongate support structure are very similar in construction, with the exception that mechanism 26 is slightly narrower to accommodate the seat tube as opposed to the handlebar shaft. Therefore, the following discussion will be made with reference to mechanism or yoke 24. Yoke 24 includes a hook member 70 and a gate member 72. The hook member is fixed relative to section 44 and the gate is pivotally mounted thereto. The end of section 44 includes two cross-holes 74, 76. A bolt 78 fits through hole 74 and through corresponding holes formed in the end of the hook and the gate.

The hook member is riveted to one side of hole 76 to prevent it from pivoting on bolt 78. The gate is free to pivot on bolt 78, but is selectively secured in the closed position by a spring-biased button 80. The spring-biased button is mounted in an end plug 82 that is slipped into the end of section 44. The button projects out of hole 76 on the gate side and fits into a corresponding hole 84 formed in the gate. The button prevents the gate from pivoting unless the button is depressed.

The free end of the gate is stabilized against bending outward by a safety retainer 90 formed on the adjacent free end of the hook. The retainer prevents the outer end of the gate from being bent outward by shifting and rocking of the bicycle or incorrect installation of the top tube. The structural portions of the hook and the gate are formed by a band of metal that is bent into the desired shaped. Plastic or other resilient material is overmolded or coated onto the bands to protect the surface of the bicycle. The overmolding on the hooks is shaped with a depression 94 to help center the secured portion of the bicycle in the hook. By centering the load in the hook, the torque creating a tendency to rotate the tube under load is minimized or eliminated. This reduces the chance that the tube will rotate so that the yokes are vertically oriented, placing a lateral rather than downward load on them.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to every one of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to some of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A surrogate top tube for a bicycle, comprising:

first and second generally planar yokes, each yoke being adapted to selectively secure a tube member of the bicycle oriented generally normal to the plane of the yoke;

an elongate support structure including first and second sections connected to the first and second yokes, respectively, the first and second sections being telescopically engaged and incorporating anti-rotation structure to prevent the first section from rotating relative to the second section, the support structure having a cross-sectional size generally corresponding to the cross-sectional size of the top tube of the bicycle and a length sufficient to extend between a seat tube and a vertical portion of the handlebars on the bicycle; and wherein the first section fits within the second section and includes a plug adapted to fit within the end of the first section, the plug having a contact portion that projects radially outward from an outside diameter of the first section to ride against an inside surface of the second section.

2. A surrogate top tube for a bicycle, comprising:

an elongate support structure including first and second ends, the support structure having a cross-sectional size generally corresponding to the cross-sectional size of the top tube of the bicycle and a length sufficient to extend between the seat tube and a vertical portion of the handlebars on the bicycle;

first and second yokes disposed at first and second ends of the support structure, where at least one of the yokes includes a hook member and a gate member, the gate member being selectively operable to allow insertion of a tubular portion of the bicycle into the hook member while both hook and gate members remain mounted to the support structure, and selectively closeable to prevent removal of the tubular portion from the hook member, the hook member and gate member including adjacent free ends lying generally in a first plane when the gate member is closed, where at least one of the members includes a safety retainer to prevent the free end of the gate member from being deformed outwardly in the first plane from a center of the hook member by an outward force in the plane applied to the free end of the gate member, wherein the gate member is pivotally mounted to the support structure, and wherein the support structure includes a spring-biased button adapted to engage a hole in the gate member to selectively secure it in a closed position.

\* \* \* \* \*